US011231814B1

(12) United States Patent
Wittenberg et al.

(10) Patent No.: US 11,231,814 B1
(45) Date of Patent: Jan. 25, 2022

(54) ELECTRONIC DEVICES WITH CURVED DISPLAY SURFACES

(71) Applicant: Apple Inc., Cupertino, CA (US)

(72) Inventors: Michael B. Wittenberg, San Francisco, CA (US); Daniel J. Barrett, Redwood City, CA (US); Erik G. de Jong, San Francisco, CA (US); Lucy E. Browning, San Francisco, CA (US); Marwan Rammah, San Francisco, CA (US); Rasamy Phouthavong, San Jose, CA (US); Sameer Pandya, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/013,057

(22) Filed: Sep. 4, 2020

Related U.S. Application Data

(60) Provisional application No. 62/929,017, filed on Oct. 31, 2019.

(51) Int. Cl.
*G09G 3/36* (2006.01)
*G06F 3/042* (2006.01)
(Continued)

(52) U.S. Cl.
CPC ............ *G06F 3/0421* (2013.01); *G02B 6/06* (2013.01); *G06F 3/0445* (2019.05); *G06F 3/167* (2013.01); *G06F 2203/04102* (2013.01)

(58) Field of Classification Search
CPC .......... G02B 6/08; G02B 6/0078; G02B 6/00; G02B 6/0005; G02B 6/0008; G02F 1/133524; G02F 1/13312; G02F 1/13338; G02F 1/13318; G06F 2203/04109; G06F 3/0412; G06F 3/042; G06F 3/03542; G06F 3/0421; G09G 3/36
See application file for complete search history.

(56) References Cited

U.S. PATENT DOCUMENTS 6,130,666 A * 10/2000 Persidsky ............ G06F 3/0354
178/19.01
6,956,564 B1 * 10/2005 Williams ............ G06F 15/0225
345/179

(Continued)

*Primary Examiner* — Michael J Eurice
(74) *Attorney, Agent, or Firm* — Treyz Law Group, P.C.; G. Victor Treyz; Tianyi He

(57) ABSTRACT

An electronic device may have light-emitting devices. A light-emitting device may include light-emitting diodes, a display, or other components that emit visual output. One or more image transport layers may be included in the electronic device. An image transport layer may have an input surface that receives an image and an output surface to which the image transport layer transports the image for viewing by a user. The image transport layers may have areas with compound curvature and other shapes. Deformed image transport layer structures such as deformed fibers in a coherent fiber bundle may be configured to hide gaps in displays and other structures. Displays may include light detectors that serve as a two-dimensional touch sensor. The touch sensor may detect touch input on an output surface of an image transport layer. Image transport layer material may be incorporated into buttons, elongated housings, wearable devices, and other equipment.

22 Claims, 19 Drawing Sheets

(51) Int. Cl.
  *G02B 6/06* (2006.01)
  *G06F 3/16* (2006.01)
  *G06F 3/044* (2006.01)

(56) References Cited

U.S. PATENT DOCUMENTS

| | | | |
|---|---|---|---|
| 7,145,611 B2 | 12/2006 | Dubin et al. | |
| 7,910,207 B2 | 3/2011 | Kamiyama et al. | |
| 9,154,677 B2 | 10/2015 | Merz | |
| 9,201,523 B1* | 12/2015 | Hwang | G06F 3/0488 |
| 9,274,369 B1* | 3/2016 | Lee | G02F 1/133524 |
| 10,223,952 B2 | 3/2019 | Powell et al. | |
| 10,579,157 B1 | 3/2020 | Wilson | |
| 10,620,365 B2 | 4/2020 | Dawson | |
| 2002/0097978 A1* | 7/2002 | Lowry | G09G 3/002 |
| | | | 385/147 |
| 2003/0112160 A1* | 6/2003 | Hsiung | G05G 1/105 |
| | | | 341/31 |
| 2005/0134751 A1* | 6/2005 | Abileah | G02F 1/13338 |
| | | | 349/42 |
| 2005/0243415 A1* | 11/2005 | Lowe | G02B 6/0028 |
| | | | 359/443 |
| 2006/0209029 A1* | 9/2006 | Gutbrod | H01H 9/181 |
| | | | 345/168 |
| 2007/0024598 A1* | 2/2007 | Miller | G06F 3/0428 |
| | | | 345/175 |
| 2007/0109239 A1* | 5/2007 | den Boer | G06F 3/0412 |
| | | | 345/87 |
| 2008/0002527 A1* | 1/2008 | Ishii | G04G 9/02 |
| | | | 368/239 |
| 2008/0014835 A1* | 1/2008 | Weston | A63F 13/73 |
| | | | 446/484 |
| 2008/0089653 A1* | 4/2008 | Hall | H04N 1/19584 |
| | | | 385/116 |
| 2008/0260250 A1* | 10/2008 | Vardi | G06F 3/03545 |
| | | | 382/186 |
| 2009/0051653 A1* | 2/2009 | Barney | A63F 13/69 |
| | | | 345/158 |
| 2009/0308719 A1* | 12/2009 | Hamada | H01H 9/18 |
| | | | 200/4 |
| 2010/0073328 A1* | 3/2010 | Lynch | G06F 3/042 |
| | | | 345/175 |
| 2010/0214135 A1* | 8/2010 | Bathiche | G06F 3/0238 |
| | | | 341/23 |
| 2010/0216514 A1* | 8/2010 | Smoyer | H04M 1/0283 |
| | | | 455/566 |
| 2011/0025594 A1 | 2/2011 | Watanabe | |
| 2012/0267222 A1* | 10/2012 | Gohng | G06F 3/016 |
| | | | 200/61.54 |
| 2013/0106721 A1* | 5/2013 | Pedersen | G06F 3/03545 |
| | | | 345/173 |
| 2014/0016071 A1* | 1/2014 | Yang | G02B 6/06 |
| | | | 349/106 |
| 2014/0166867 A1* | 6/2014 | Shiu | G01J 1/0444 |
| | | | 250/239 |
| 2014/0218961 A1 | 8/2014 | Wu | |
| 2014/0253467 A1* | 9/2014 | Hicks | G06F 3/033 |
| | | | 345/173 |
| 2014/0253468 A1* | 9/2014 | Havilio | G06F 3/03545 |
| | | | 345/173 |
| 2014/0254123 A1* | 9/2014 | Osborne | G06F 1/1675 |
| | | | 361/807 |
| 2015/0092395 A1* | 4/2015 | Wu | G02B 6/0061 |
| | | | 362/97.1 |
| 2015/0171124 A1* | 6/2015 | Temil | G02B 6/43 |
| | | | 250/208.1 |
| 2017/0061526 A1* | 3/2017 | Villanueva | G06F 3/03545 |
| 2017/0094815 A1* | 3/2017 | Chin | G02B 6/08 |
| 2018/0089491 A1* | 3/2018 | Kim | G06K 9/00912 |
| 2018/0114474 A1* | 4/2018 | Powell | G02F 1/133526 |
| 2018/0128973 A1 | 5/2018 | Powell et al. | |
| 2019/0180072 A1* | 6/2019 | Fomani | G06K 9/00046 |
| 2019/0391326 A1 | 12/2019 | Yang et al. | |
| 2020/0242969 A1* | 7/2020 | Lubiner | G09B 21/002 |

* cited by examiner

# ELECTRONIC DEVICES WITH CURVED DISPLAY SURFACES

This application claims the benefit of provisional patent application No. 62/929,017, filed Oct. 31, 2019, which is hereby incorporated by reference herein in its entirety.

FIELD

This relates generally to electronic devices, and, more particularly, to electronic devices with displays.

BACKGROUND

Electronic devices may have displays. Displays have arrays of pixels for displaying images for a user. The shape and other characteristics of many displays can pose challenges during integration of displays and other components into an electronic device, particularly in situations where space is limited.

SUMMARY

Electronic devices may have image transport layers formed from coherent fiber bundles or Anderson localization material and may have light-emitting devices that provide light to the image transport layers. A light-emitting device may include light-emitting diodes, a display, or other components that emit visual output.

An image transport layer may have an input surface that receives an image and an output surface to which the image transport layer transports the image for viewing by a user. The image transport layers may have areas with compound curvature and other shapes. Deformed image transport layer structures such as deformed fibers in a coherent fiber bundle may be configured to hide gaps in displays and other structures.

Displays may include light detectors that serve as a two-dimensional touch sensor. The touch sensor may detect touch input on an output surface of an image transport layer that overlap the display.

Image transport layer material may be incorporated into buttons, elongated housings, wearable devices, and other equipment. If desired, a flexible display may be covered with an image transport layer. Image transport layers may also have input surfaces covered with coatings. For example, an image transport layer may have an opaque coating on its inner surface. A window in the opaque coating may overlap an optical component.

DETAILED DESCRIPTION

An electronic device may have a display. The display may have an array of pixels for creating an image. The image may pass through a display cover layer that overlaps the array of pixels. To minimize display borders or to otherwise create a desired appearance for the display, the display cover layer may include an image transport layer. The image transport layer may have an input surface that receives an image from the array of pixels and a corresponding output surface to which the image is transported from the input surface. A user viewing the image transport layer will view the image from the array of pixels as being located on the output surface.

In configurations in which the input and output surfaces have different shapes, the image transport layer may be used to warp the image produced by the array of pixels. For example, the shape of the image can transformed and the effective size of the image can be changed as the image passes through the image transport layer. In some configurations, edge portions of the image are stretched outwardly to help minimize display borders.

Image transport layers can be formed from coherent fiber bundles (sometimes referred to as fiber optic plates) and/or Anderson localization material. Glass and/or polymer may be used in forming image transport layer structures. To help protect the output surface of an image transport layer, an optional transparent protective layer may be included on the outer surface of the display cover layer. This transparent protective layer may be, for example, a glass plate or a protective layer formed from other transparent material such as clear polymer or sapphire or other crystalline materials. In some arrangements, image transport layers and/or protective layers can be formed over components other than displays.

To accommodate a variety of form factors for enhancing device aesthetics and ergonomics, it may be desirable to use image transport layer material to present images and other visible output on curved surfaces. The curved surfaces may, as an example, be associated with three-dimensional shapes such as three-dimensional shapes with areas of compound curvature. It may also be desirable to include optical touch sensing and other features in devices with image transport layers.

Figure 1:
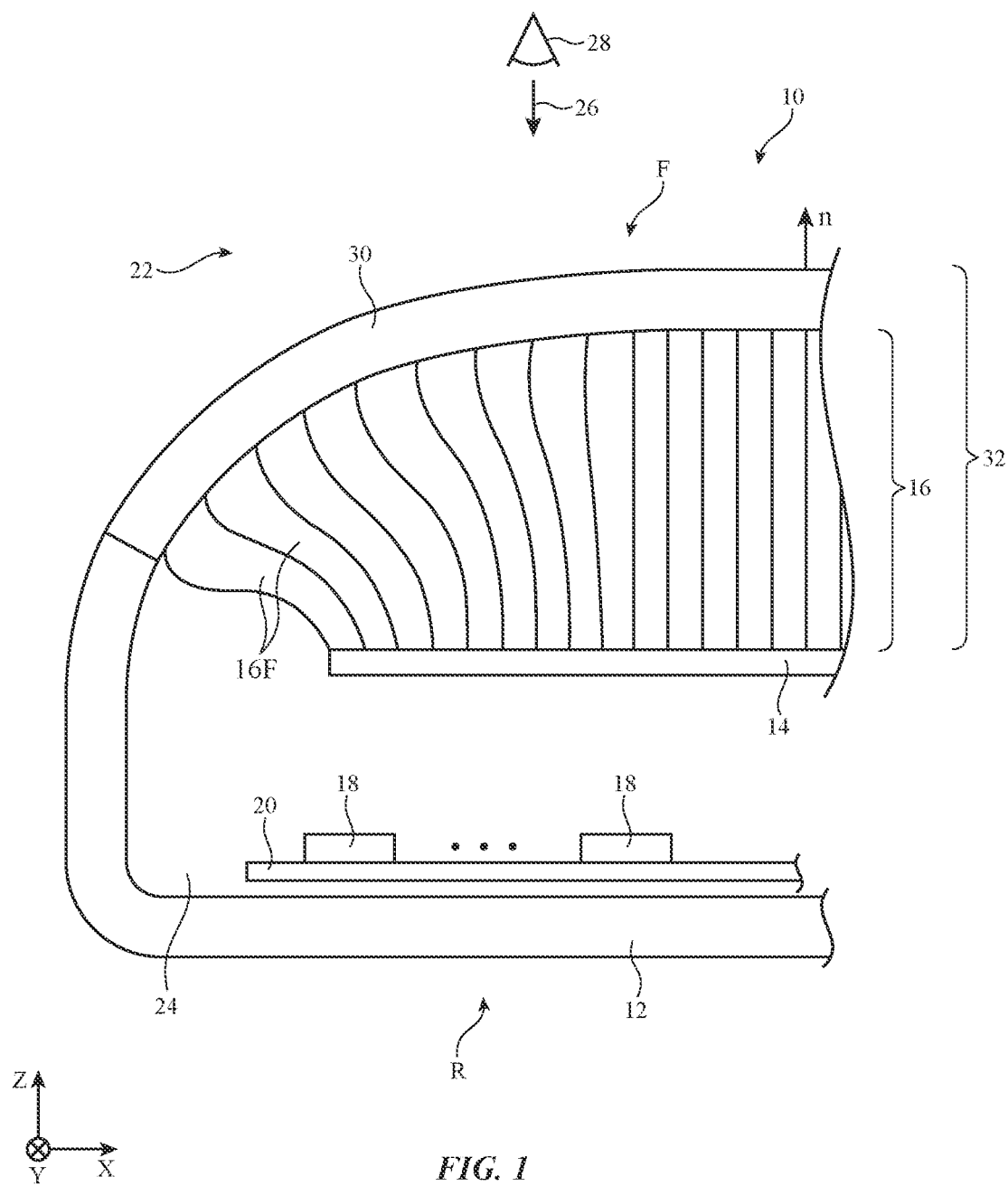
FIG. 1 is a side view of an illustrative electronic device with an image transport layer in accordance with an embodiment.

A cross-sectional side view of a portion of an illustrative electronic device with a display cover layer that includes an image transport layer is shown in FIG. 1. In the example of FIG. 1, device 10 is a portable device such as a cellular telephone, wristwatch, or tablet computer. In general, any type of electronic device may have an image transport layer such as a desktop computer, a voice-control speaker, a television or other non-portable display, a head-mounted device, an embedded system such as a system built into a vehicle or home, an electronic device accessory, and/or other electronic equipment.

Device 10 includes a housing such as housing 12. Housing 12 may be formed from polymer, metal, glass, crystalline material such as sapphire, ceramic, fabric, fibers, fiber composite material, natural materials such as wood and cotton, other materials, and/or combinations of such materials. Housing 12 may be configured to form housing walls. The housing walls may enclose one or more interior regions such as interior region 24 and may separate interior region 24 from exterior region 22. In some configurations, an opening may be formed in housing 12 for a data port, a power port, to accommodate audio components, or to accommodate other devices. Clear housing regions may be used to form optical component windows. Dielectric housing structures may be used to form radio-transparent areas for antennas and wireless power components.

Electrical components 18 may be mounted in interior region 24. Electrical components 18 may include integrated circuits, discrete components, light-emitting components, sensors, and/or other circuits and may, if desired, be interconnected using signal paths in one or more printed circuits such as printed circuit 20. If desired, one or more portions of the housing walls may be transparent (e.g., so that light associated with an image on a display or other light-emitting or light-detecting component can pass between interior region 24 and exterior region 22).

Electrical components 18 may include control circuitry. The control circuitry may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in the control circuitry may be used to control the operation of device 10. For example, the processing circuitry may use sensors and other input-output circuitry to gather input and to provide output and/or to transmit signals to external equipment. The processing circuitry may be based on one or more microprocessors, microcontrollers, digital signal processors, baseband processors, power management units, audio chips, application specific integrated circuits, etc. The control circuitry may include wired and/or wireless communications circuitry (e.g., antennas and associated radio-frequency transceiver circuitry such as cellular telephone communications circuitry, wireless local area network communications circuitry, etc.). The communications circuitry of the control circuitry may allow device 10 to communicate with other electronic devices. For example, the control circuitry (e.g., communications circuitry in the control circuitry) may be used to allow wired and/or wireless control commands and other communications to be conveyed between devices such as cellular telephones, tablet computers, laptop computers, desktop computers, head-mounted devices, handheld controllers, wristwatch devices, other wearable devices, keyboards, computer mice, remote controls, speakers, accessory displays, accessory cameras, and/or other electronic devices. Wireless communications circuitry may, for example, wirelessly transmit control signals and other information to external equipment in response to receiving user input or other input from sensors or other devices in components 18.

Input-output circuitry in components 18 of device 10 may be used to allow data to be supplied to device 10 and to allow data to be provided from device 10 to external devices. The input-output circuitry may include input devices that gather user input and other input and may include output devices that supply visual output, audible output, or other output.

Output may be provided using light-emitting diodes (e.g., crystalline semiconductor light-emitting diodes for status indicators and/or displays, organic light-emitting diodes in displays and other components), lasers, and other light-emitting devices, audio output devices (e.g., tone generators and/or speakers), haptic output devices (e.g., vibrators, electromagnetic actuators, piezoelectric actuators, and/or other equipment that supplies a user with haptic output), and other output devices.

The input-output circuitry of device 10 (e.g., the input-output circuitry of components 18) may include sensors. Sensors for device 10 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into a display, a two-dimensional capacitive touch sensor and/or a two-dimensional force sensor overlapping a display, and/or a touch sensor or force sensor that forms a button, trackpad, or other input device not associated with a display), and other sensors. Touch sensors for a display or for other touch components may be based on an array of capacitive touch sensor electrodes, acoustic touch sensor structures, resistive touch components, force-based touch sensor structures, a light-based touch sensor, or other suitable touch sensor arrangements. If desired, a display may have a force sensor for gathering force input (e.g., a two-dimensional force sensor may be used in gathering force input on a display).

If desired, the sensors may include optical sensors such as optical sensors that emit and detect light, optical touch sensors, optical proximity sensors, and/or other touch sensors and/or proximity sensors, monochromatic and color ambient light sensors, image sensors, fingerprint sensors, ultrasonic sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors (e.g., sensors that gather position information, three-dimensional radio-frequency images, and/or other information using radar principals or other radio-frequency sensing), depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, three-dimensional sensors (e.g., time-of-flight image sensors, pairs of two-dimensional image sensors that gather three-dimensional images using binocular vision, three-dimensional structured light sensors that emit an array of infrared light beams or other structured light using arrays of lasers or other light emitters and associated optical components and that capture images of the spots created as the beams illuminate target objects, and/or other three-dimensional image sensors), facial recognition sensors based on three-dimensional image sensors, and/or other sensors.

In some configurations, components 18 may include mechanical devices for gathering input (e.g., buttons, joysticks, scrolling wheels, key pads with movable keys, keyboards with movable keys, and other devices for gathering user input). During operation, device 10 may use sensors and/or other input-output devices in components 18 to gather user input (e.g., buttons may be used to gather button press input, touch and/or force sensors overlapping displays can be used for gathering user touch screen input and/or force input, touch pads and/or force sensors may be used in gathering touch and/or force input, microphones may be used for gathering audio input, etc.). The control circuitry of device 10 can then take action based on this gathered information (e.g., by transmitting the information over a wired or wireless path to external equipment, by supplying a user with output using a haptic output device, visual output device, an audio component, or other input-output device in housing 12, etc.).

If desired, electronic device 10 may include a battery or other energy storage device, connector ports for supporting wired communications with ancillary equipment and for receiving wired power, and other circuitry. In some configurations, device 10 may serve as an accessory and/or may include a wired and/or wireless accessory (e.g., a keyboard, computer mouse, remote control, trackpad, etc.).

Device 10 may include one or more displays such as display 14. The displays may, for example, include an organic light-emitting diode display, a liquid crystal display, a display having an array of pixels formed from respective light-emitting diodes (e.g., a pixel array having pixels with crystalline light-emitting diodes formed from respective light-emitting diode dies such as micro-light-emitting diode dies), and/or other displays. The displays may include rigid display structures and/or may be flexible displays. For example, a light-emitting diode display may have a polymer substrate that is sufficiently flexible to be bent. Display 14 may have a rectangular pixel array or a pixel array of another shape for displaying images for a user and may therefore sometimes be referred to as a pixel array. Display 14 may also sometimes be referred to as a display panel, display layer, or pixel layer. Each pixel array in device 10 may be mounted under a transparent housing structure (sometimes referred to as a transparent display cover layer).

In the example of FIG. 1, display (pixel array) 14 is mounted under display cover layer 32. Display cover layer 32 (which may be considered to form a portion of the housing of device 10), covers front face F of device 10. Configurations in which opposing rear face R of device 10 and/or sidewall portions of device 10 have transparent structures covering displays and other optical components may also be used.

As shown in FIG. 1, display cover layer 32 may include image transport layer 16 and protective layer 30. Protective layer 30 may be formed from a layer of glass, clear polymer, crystalline material such as sapphire or other crystalline material, and/or other transparent material. The presence of layer 30 may help protect the outer surface of layer 16 from scratches. If desired, layer 30 may be omitted (e.g., in configurations in which a thin-film protective coating is present on the outer surface of layer 16, in configurations in which layer 16 is formed from hard material such as glass, and/or in other configurations in which layer 16 is resistant to scratching). A layer of adhesive and/or other structures may be formed between protective layer 30 and image transport layer 16 and/or may be included elsewhere in the stack of layers on display 14.

During operation, the pixels of display 14 produce image light that passes through image transport layer 16. In configurations in which image transport layer 16 is formed from a coherent fiber bundle, image transport layer 16 has optical fibers 16F. The fibers or other optical structures of image transport layer structures such as image transport layer 16 transport light (e.g., image light and/or other light) from one surface (e.g., an input surface of layer 16 that faces display 14) to another (e.g., an output surface of layer 16 that faces viewer 28, who is viewing device 10 in direction 26). As the image presented to the input surface of layer 16 is transported to the output surface of layer 16, the integrity of the image light is preserved. This allows an image produced by an array of pixels to be transferred from an input surface of a first shape at a first location to an output surface with a different shape (e.g., a shape with a footprint that differs from that of the input surface, a shape with a curved cross-sectional profile, a shape with a region of compound curvature, and/or a shape with other desired features).

Image transport layer 16 may therefore move the location of an image and may optionally change the shape of the surface on which the image is presented. In effect, viewer 28 will view the image from display 14 as if the image were generated on the output surface of image transport layer 16. In arrangements in which the image from display 14 is warped (geometrically distorted) by image transport layer 16, digital pre-distortion techniques or other compensation techniques may be used to ensure that the final image viewed on the output surface of image transport layer 16 has a desired appearance. For example, the image on display 14 may be prewarped so that this prewarped image is warped by an equal and opposite amount upon passing through layer 16. In this way, the prewarped image is effectively unwarped by passage through layer 16 will not appear distorted on the output surface.

In configurations of the type shown in FIG. 1, device 10 may have four peripheral edges and a rectangular footprint when viewed in direction 26 or may have other suitable shapes. To help minimize the size of inactive display borders as a user is viewing front face F of device 10 as shown in FIG. 1, the shapes of fibers 16F along the periphery of layer 16 may be deformed outwardly as shown in FIG. 1. These fibers 16F each have an outwardly bent segment that bends away from surface normal n of the center of layer 30 (e.g., away from an axis parallel to the Z axis of FIG. 1) and each have an inwardly bent segment that bends back towards surface normal n to help direct output light towards viewer 28.

The deformed shapes of fibers 16F (and/or the corresponding deformations made to optical filaments in Anderson localization material in layer 16) may help distribute image light laterally outwards in the X-Y plane so that the effective size of display 14 is enlarged and the image produced by display 14 covers some or all of the sidewalls of housing 12 or other peripheral portions of device 10 when the image on front face F is being viewed by viewer 28. For example, the bent shapes of fibers 16F of FIG. 1 may help shift portions of the displayed image laterally outward in the X-Y plane along the edges and corners of device 10 to block the edges of device 10 from view. In some arrangements, the portions of fibers 16F at the outermost surface of layer 16 are oriented parallel or nearly parallel with viewing direction 26 and the Z axis of FIG. 1, which helps ensure that some or all of the light that has passed through layer 16 will travel in the Z direction and be viewable by viewer 28.

Figure 2:
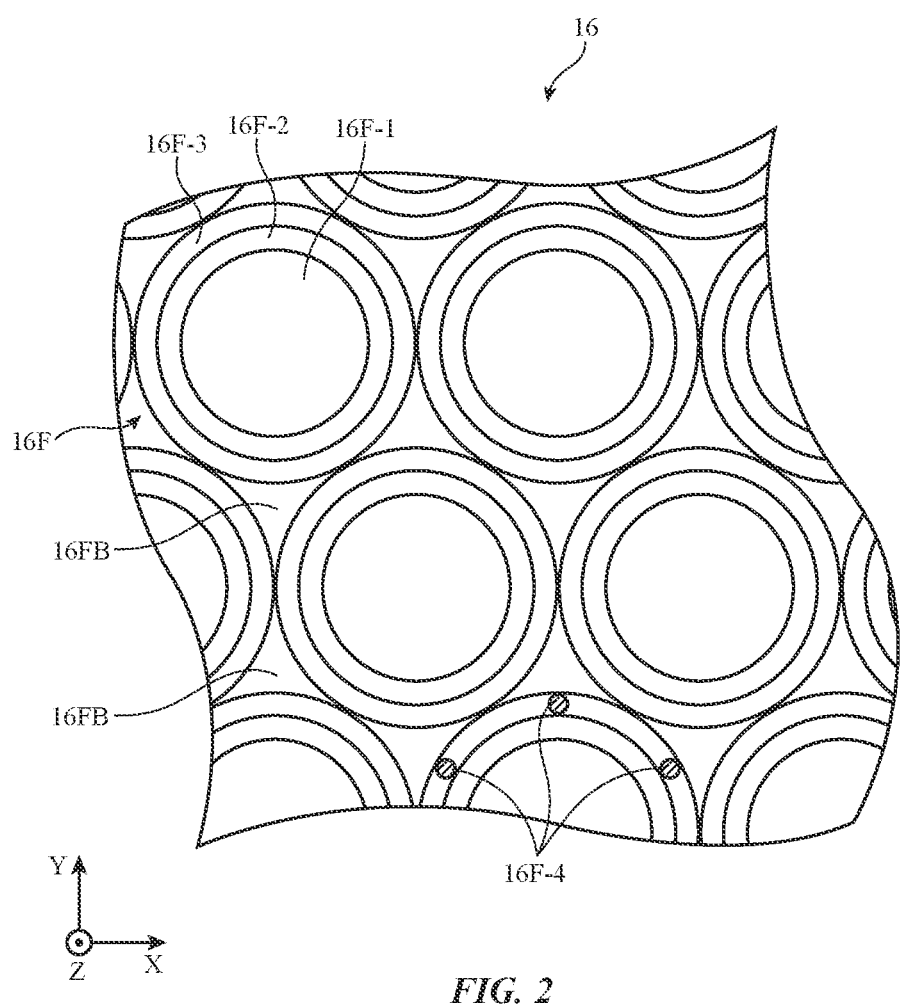
FIG. 2 is a cross-sectional view of a portion of an illustrative image transport layer formed using a coherent fiber bundle in accordance with an embodiment.

FIG. 2 is a cross-sectional view of a portion of image transport layer 16 in an illustrative configuration in which image transport layer 16 is formed from a coherent fiber bundle. Fibers 16F for layer 16 may have any suitable configuration. As shown in the example of FIG. 2, fibers 16F may each have a core such as core 16F-1. Cores 16F-1 and the other structures of image transport layer (e.g., cladding structures, binder, etc.) 16 may be formed from materials such as polymer, glass, crystalline material such as sapphire, and/or other materials. Some or all of these materials may be transparent. Arrangements in which some of the materials absorb light and/or have non-neutral colors or other light filtering properties may also be used.

Fiber cores 16F-1 may be formed from transparent material of a first refractive index and may be surrounded by cladding of a second, lower refractive index to promote light guiding in accordance with the principal of total internal reflection. In some arrangements, a single coating layer on cores 16F-1 may be used to form the cladding. In other arrangements, two or more coating layers on cores 16F-1 may be used to form the cladding. Clad fibers may be held together using binder 16FB, which serves to fill the interstitial spaces between the clad fibers and join fibers 16F together. In some configurations, stray light absorbing material may be incorporated into layer 16 (e.g., into some of the cores, cladding, and/or binder). The stray light absorbing material may be, for example, polymer, glass, or other material into which light-absorbing material such as dye and/or pigment has been incorporated.

In an illustrative configuration, layer 16 may have inner coating layers 16F-2 that are formed directly on the outer surfaces of cores 16F-1 and outer coating layers 16F-3 that are formed directly on the outer surfaces of layers 16F-2. Additional coating layers (e.g., three or more coating layers) or fewer coating layers (e.g., a single coating layer) may be formed on fiber cores 16F-1, if desired. Stray light-absorbing material may be used in layers 16F-2 and/or 16F-3 or other coating layer(s) on cores 16F-1. In an illustrative arrangement, layers 16F-2 and 16F-3, which may sometimes be referred to as forming first and second cladding portions (or first and second claddings) of the claddings for fiber cores 16F-1, may respectively be formed from transparent material and stray light-absorbing material. Other arrangements may be used, if desired (e.g., arrangements in which stray light absorbing material is incorporated into some or all of binder 16FB, arrangements in which cores 16F-1 are coated with inner and outer transparent claddings and an interposed intermediate stray-light-absorbing cladding, arrangements in which cores 16F-1 are covered with a single stray-light-absorbing cladding, arrangements in which some or all of fibers 16F are provided with longitudinally extending filaments 16F-4 of stray light absorbing material located, for example, on or in any of the cladding layers, etc.).

In configuration in which fibers 16F have claddings formed from two or more separate cladding layers, the cladding layers may have the same index of refraction or the outermost layers may have lower refractive index values (as examples). Binder 16FB may have a refractive index equal to the refractive index of the cladding material or lower than the refractive index of the cladding material to promote total internal reflection (as examples). For example, each fiber core 16F-1 may have a first index of refraction and the cladding material surrounding that core may have a second index of refraction that is lower than the first index of refraction by an index difference of at least 0.05, at least 0.1, at least 0.15, at least 10%, at least 20%, less than 50%, less than 30%, or other suitable amount. The binder refractive index may be the same as that of some or all of the cladding material or may be lower than the lowest refractive index of the cladding by an index difference of at least 0.05, at least 0.1, at least 0.15, at least 10%, at least 20%, less than 50%, less than 30%, or other suitable amount.

The diameters of cores 16F-1 may be, for example, at least 5 microns, at least 7 microns, at least 8 microns, at least 9 microns, less than 40 microns, less than 17 microns, less than 14 microns, less than 11 microns, or other suitable diameter. Fibers 16F (including cores and claddings) may have diameters of at least 6 microns, at least 7 microns, at least 8 microns, at least 9 microns, less than 50 microns, less than 17 microns, less than 14 microns, less than 11 microns, or other suitable diameter.

Fibers 16F may generally extend parallel to each other in image transport layer 16 (e.g., the fibers may run next to each other along the direction of light propagation through the fiber bundle). This allows image light or other light that is presented at the input surface to layer 16 to be conveyed to the output surface of layer 16.

If desired, image transport layer 16 may be formed from Anderson localization material in addition to or instead of fibers 16F. Anderson localization material is characterized by transversely random refractive index features (higher index regions and lower index regions) of about two wavelengths in lateral size that are configured to exhibit two-dimensional transverse Anderson localization of light (e.g., the light output from the display of device 10). These refractive index variations are longitudinally invariant (e.g., along the direction of light propagation, perpendicular to the surface normal of a layer of Anderson localization material).

Figure 3:
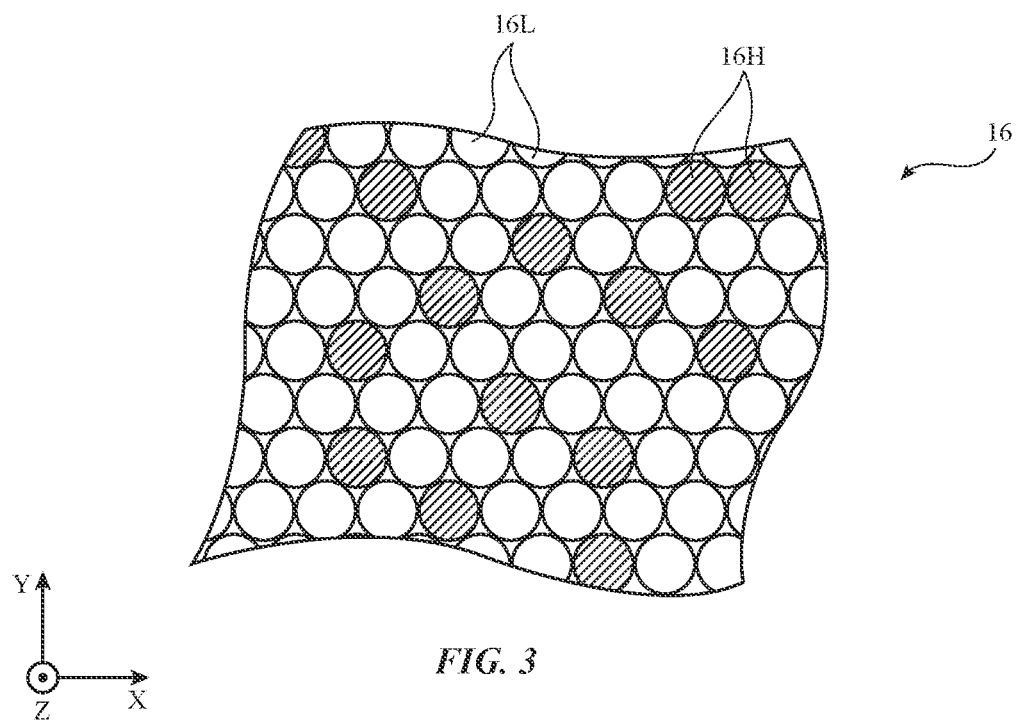
FIG. 3 is a cross-sectional view of a portion of an illustrative image transport layer formed using Anderson localization material in accordance with an embodiment.

FIG. 3 is a cross-sectional view of a portion of an image transport layer formed from Anderson localization material. In the example of FIG. 3, image transport layer 16 includes a random (pseudorandom) set of elongated optical structures of different refractive index values. These structures may, for example, be optical filaments that run into and out of the page of FIG. 3 and that have different refractive index values such as first filaments 16H with higher refractive index values and second filaments 16L with lower refractive index values. The refractive indices of filaments 16L and 16H may differ by any suitable amount (e.g., by at least 0.05, at least 0.1, at least 0.2, at least 0.3, by less than 0.8, etc.). The filaments may be distributed laterally (in dimensions X and Y) with a random pattern and may have any suitable cross-sectional shape (circular, rectangular, etc.). Anderson localization material preforms can be formed by drawing and assembling individual filaments of different refractive index values into bundles and/or can be formed by extruding lengths of material that include laterally interspersed areas of different respective refractive index values. Preforms can then be formed into layer 16 using one or more fusing and drawing operations. Other fabrication techniques may be used, if desired. To absorb stray light within an image transport layer formed from Anderson localization material, the Anderson localization material may include light absorbing material (e.g., light-absorbing filaments interspersed with transparent filaments or other light-absorbing structures).

Figure 4:
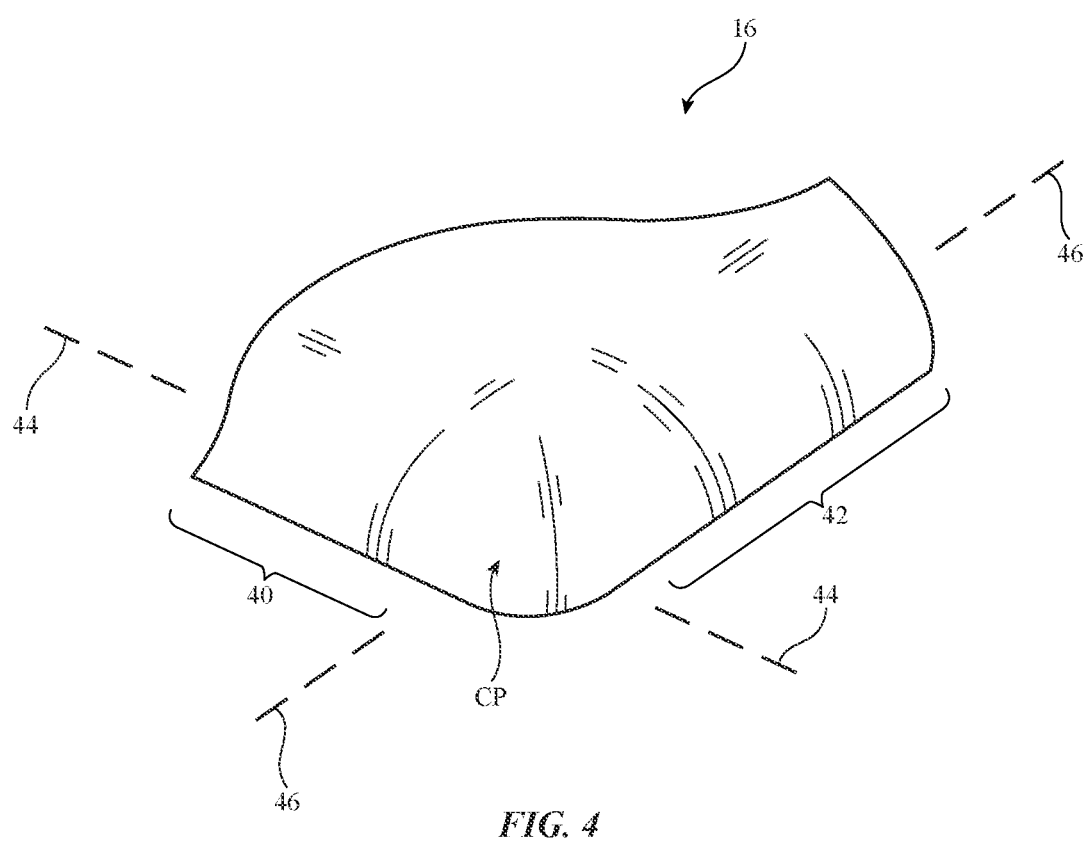
FIG. 4 is a perspective view of a portion of an image transport layer surface with compound curvature in accordance with an embodiment.

Image transport layers can be used to transport an image from a first surface (e.g., the surface of a pixel array) to a second surface (e.g., a surface in device 10 with compound curvature or other curved and/or planar surface shape) while preserving the integrity of the image. A perspective view of an illustrative corner portion of image transport layer 16 is shown in FIG. 4. In the example of FIG. 4, device 10 has edge portions 40 and 42 with surfaces that curve about axes 44 and 46, respectively. These portions of layer 16 may extend parallel to the straight sides of device 10 (as an example) and are characterized by curved surfaces that can be flattened into a plane without distortion (sometimes referred to as developable surfaces). At the corner of image transport layer 16 of FIG. 4, image transport layer 16 has curved surface portions CP with compound curvature (e.g., a surface that can only be flattened into a plane with distortion, sometimes referred to as a surface with Gaussian curvature). In a rectangular layout with curved corners, image transport layer 16 may have four corners with compound curvature. Image transport layers of other shapes (e.g., circular outlines, etc.) may also have surfaces with compound curvature (e.g., dome-shaped surfaces). When overlapped by protective layer 30, the overlapping portions of protective layer 30 may have corresponding surfaces with compound curvature. When selecting the size and shape of the output surface of layer 16 and therefore the size and shape of the image presented on the output surface, the use of an image transport layer material with compound curvature can provide design flexibility.

Figure 5:
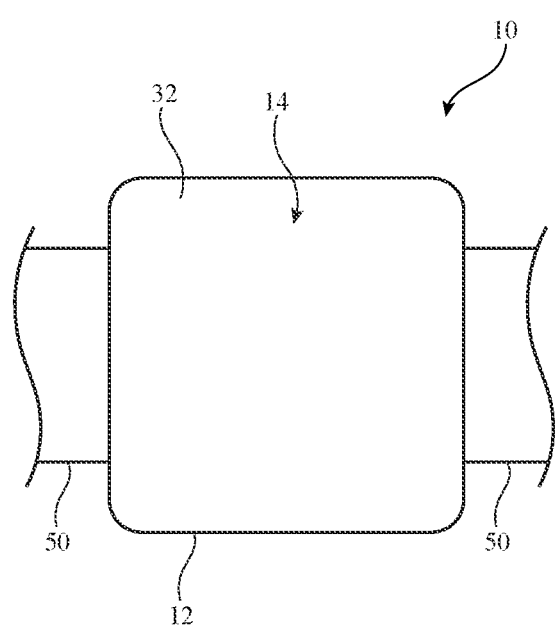
FIG. 5 is a top view of an illustrative electronic device in accordance with an embodiment.

In some arrangements, device 10 may include support structures such as wearable support structures. This allows device 10 to be worn on a body part of a user (e.g., the user's wrist, arm, head, leg, or other portion of the user's body). As an example, device 10 may include a wearable band, such as band 50 of FIG. 5. Band 50, which may sometimes be referred to as a wristband, wrist strap, or wristwatch band, may be formed from polymer, metal, fabric, leather or other natural materials, and/or other material, may have links, may stretch, may be attached to housing 12 in a fixed arrangement, may be detachably coupled to housing 12, may have a single segment or multiple segments joined by a clasp, and/or may have other features that facilitate the wearing of device 10 on a user's wrist.

To accommodate design goals such as minimizing unnecessary device bulk, enhancing a user's ability to view and interact with visual content, and otherwise enhancing device performance, it may be desirable for image transport layers in electronic devices to have output surfaces (and, if desired, input surfaces) with curved surfaces (e.g., surfaces with compound curvature and other curved surfaces).

Figure 6:
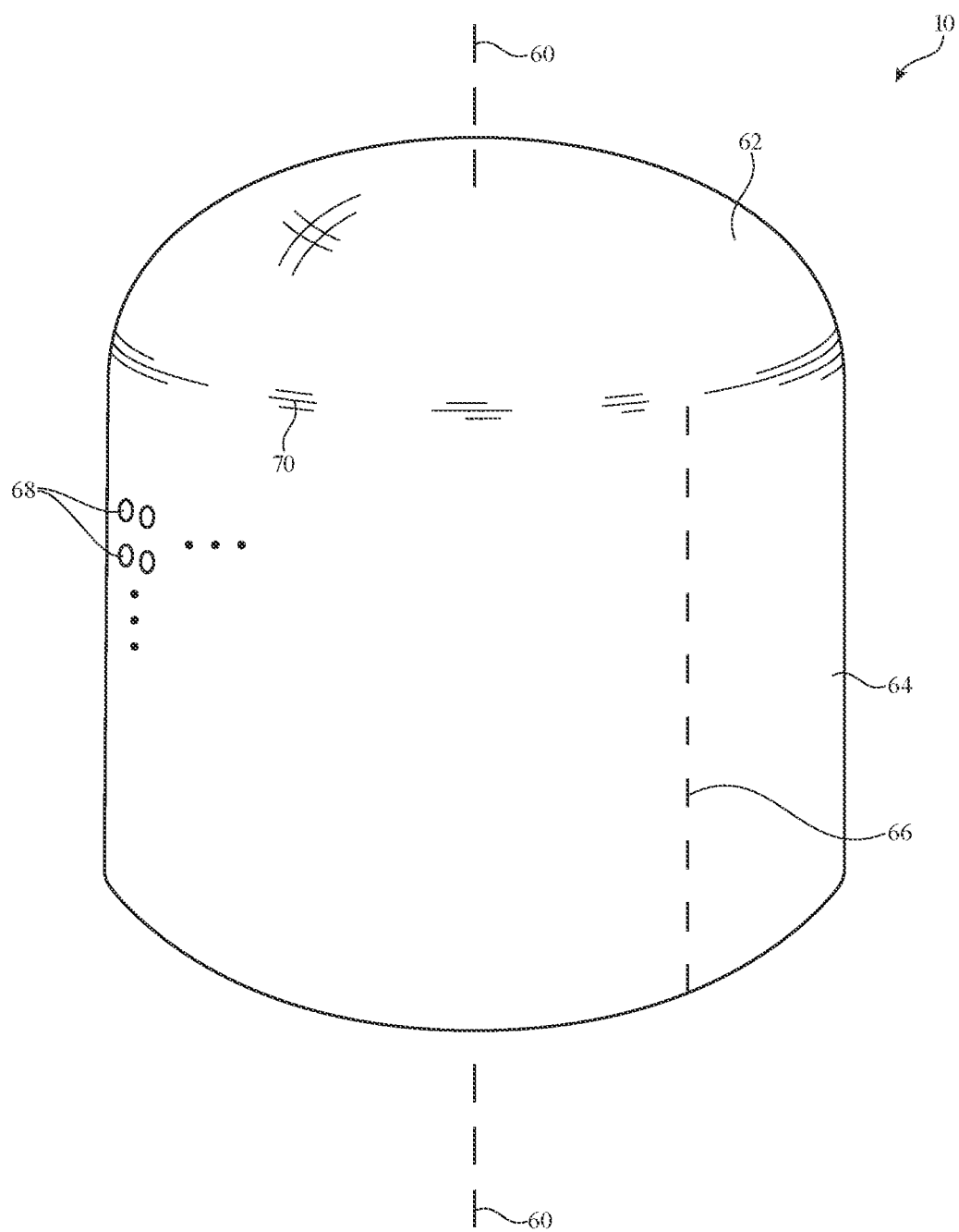
FIG. 6 is a perspective view of an illustrative electronic device with a rounded top and curved sides in accordance with an embodiment.

Consider, as an example, illustrative electronic device 10 of FIG. 6. In the example of FIG. 6, device 10 has a housing with an elongated cylindrical shape. In this type of arrangement, device 10 extends along longitudinal axis 60 and is rotationally symmetric about longitudinal axis 60. Upper surface 62 of device 10 may have a convex dome shape that is characterized by compound curvature. Sidewall surface 64 may have a curved cross-sectional profile. For example, sidewall surface 64 may from a cylindrical surface that extends around axis 60. Device 10 may be a voice-controlled speaker or other electronic device. In arrangements in which device 10 contains audio components such as speakers, one or more openings may be formed in sidewall surface 64 and/or upper surface 62 (see, e.g., openings 68). Openings 68 may be used to form acoustic ports that allow sound to pass from the interior of device 10 to the exterior region surrounding device 10 and/or that allow sound to pass from the exterior of device 10 to the interior of device 10.

It may be desirable to present visual content on the exterior surface of device 10. Accordingly, some or all of surface 62 and/or some or all of surface 64 may be covered with the output surface(s) of one or more image transport layers. As an example, a first image transport layer with a dome-shaped output surface and a circular outline may be mounted to the top of device 10. The dome-shaped output surface may form surface 62 of FIG. 6. A second image transport layer with a cylindrical output surface may wrap around device 10 (e.g., about axis 60) to form some or all of sidewall surface 64. Along vertical seam 66, portions of the second image transport layer may meet to cover a gap in an underlying curved flexible display that has been wrapped into a cylindrical tube shape (as an example). The first and second image transport layers may have portions that join along seam 70. Seam 70 may have a circular shape that runs around the circular periphery of the dome-shaped output surface of the first image transport layer (surface 62).

In the example of FIG. 6, substantially all of the exterior surface of device 10 is covered by the output surfaces of image transport layers. If desired, some of the exterior of device 10 may be formed form opaque polymer, glass, metal, and/or other materials and may not be covered with image transport layer material. In device 10 of FIG. 6 and/or other devices 10, optional protective layer 30 may overlap the image transport layer material to help protect the image transport layer material from damage (as described in connection with layer 30 of layer 32 in FIG. 1). Illustrative arrangements in which layer 30 has been omitted may sometimes be described herein as an example.

Using an arrangement of the type shown in FIG. 6, visual content may be provided over some or all of the exterior surface of device 10. Device 10 may, as an example, include light sources such as one or more colored light-emitting diodes or lasers (e.g., light sources that emit white light and/or colored light). Light from the light-emitting diodes or lasers may be conveyed from image transport layer input surfaces through the image transport layers of device 10 in fixed and/or moving patterns to surfaces 62 and/or 64 (e.g., to provide a user with visual feedback in response to received voice commands from the user). In some arrangements, patterns of light or images including text, photographs, moving image content, and/or other visual content may be provided using one or more displays.

Figure 7:
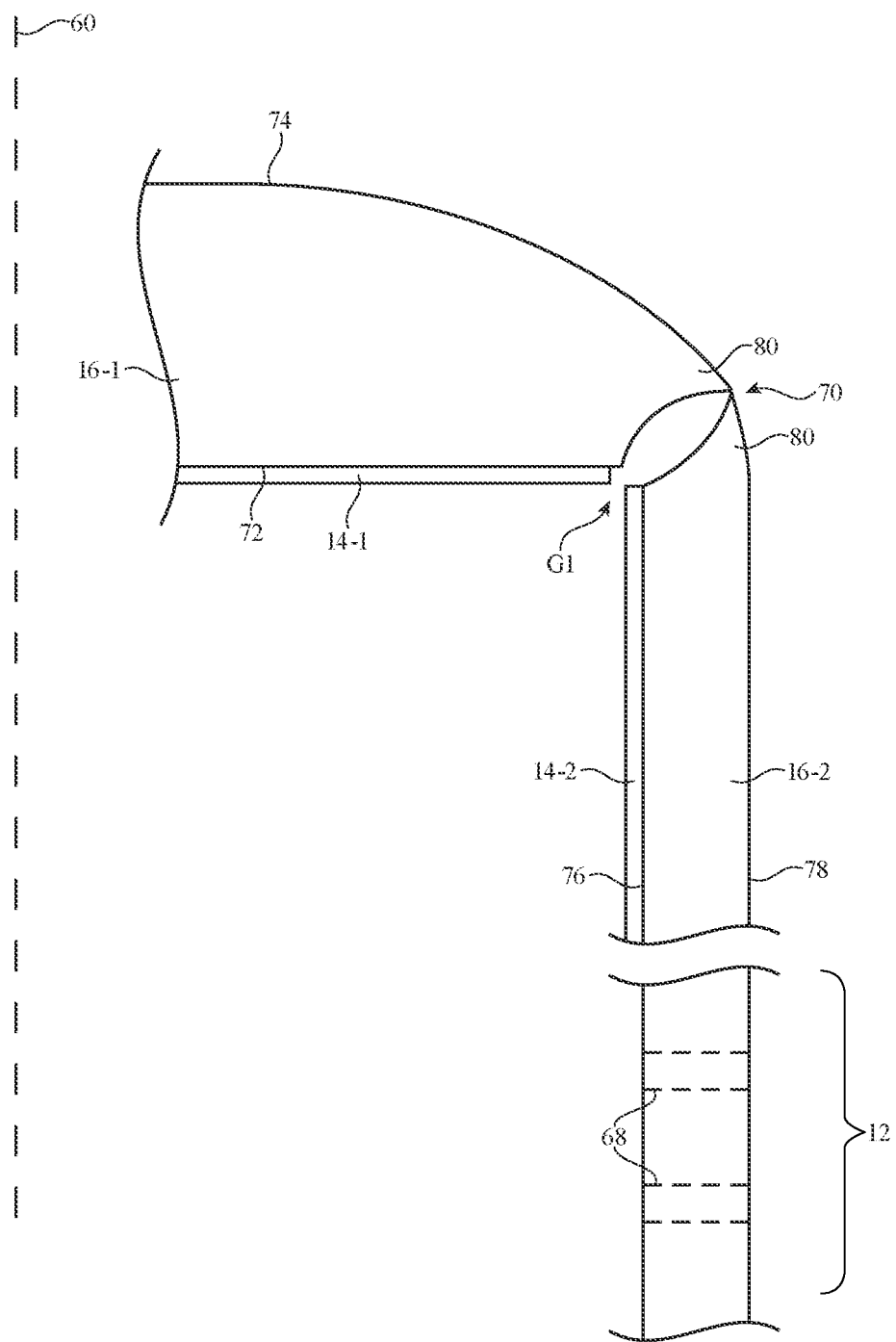
FIG. 7 is a cross-sectional side view of a portion of the illustrative electronic device of FIG. 6 in the vicinity of a seam between an upper dome-shaped portion with an image transport layer and a sidewall that includes an additional image transport layer in accordance with an embodiment.

FIG. 7 is a cross-sectional side view of device 10 of FIG. 1 in an illustrative configuration in which device 10 has two light-emitting devices (e.g., displays). First display 14-1 is overlapped by first image transport layer 16-1. Image transport layer 16-1 receives an image on display 14-1 at input surface 72 and transports this image to curved output surface 74. Output surface 74 may form an output surface with a circular periphery such as dome-shaped surface 62 of device 10 of FIG. 6. Input surface 72 may have a rectangular shape, a circular shape, or other suitable shape and may be planar or curved. Second display 14-2 is overlapped by second image transport layer 16-2. Image transport layer 16-2 receives an image on display 14-2 at input surface 76 and transports this image to output surface 78. Output surface 78 may form cylindrically shaped surface 64 of device 10 of FIG. 6. Input surface 76 may have a cylindrical shape and may be directly adjacent to a cylindrical outwardly facing surface of display 14-2. Portions of the sidewall of device 10 may be free of image transport layer material. For example, housing 12 may include a polymer wall, fabric, metal layers, and/or other structures that do not include image transport layer material. Openings 68 may be formed in image transport layer 16-2 and/or in other housing structures.

Figure 8:
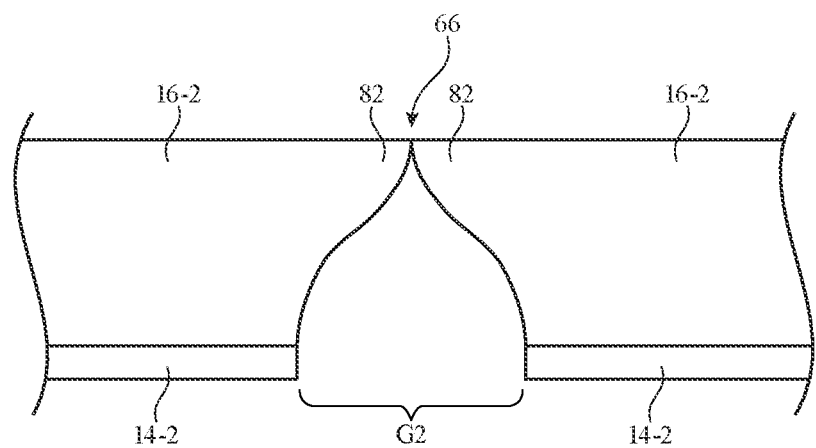
FIG. 8 is a cross-sectional side view of a sidewall seam in the illustrative electronic device of FIG. 6 in accordance with an embodiment.

Deformed portions 80 of image transport layers 16-1 and 16-2 may be configured to join each other smoothly along circular seam 70, thereby presenting image content that covers gap G1 between the adjacent edges of displays 14-1 and 14-2. As shown in FIG. 8, image transport layer 16-2 may have deformed portions 82 that join smoothly along vertical seam 66, thereby covering and hiding gap G2 between respective edges of display 14-2.

Figure 9:
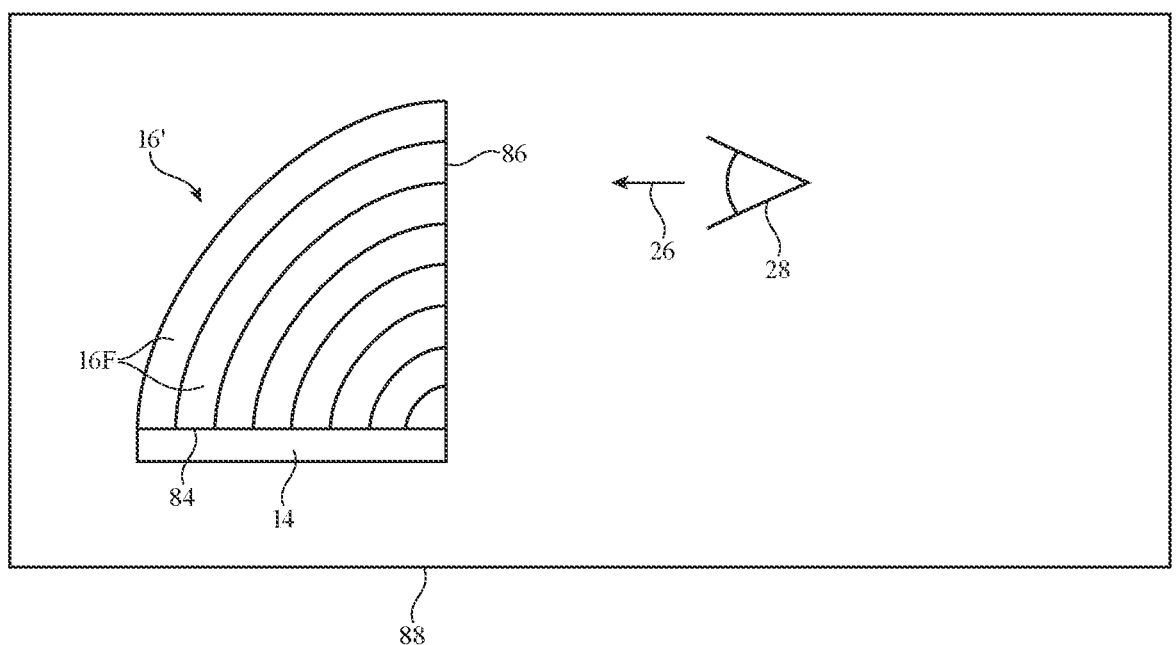
FIG. 9 is a side view of an illustrative display system that includes a structure formed from image transport layer material in accordance with an embodiment.

In the illustrative arrangement of FIG. 9, an image transport structure (structure 16') is formed from a block of image transport layer material (e.g., a coherent fiber bundle with bent fibers 16F). Display 14 provides an image to input surface 84 of structure 16'. This image is transported by structure 16' to corresponding output surface 86. This type of arrangement may be used in a system (e.g., system 88) such as a vehicle or a building such as an office or home. Because surfaces 84 and 86 are not parallel to each other (e.g., the surface normals of surfaces 84 and 86 are not parallel to each other), structure 16' changes the apparent orientation of display 14. As shown in FIG. 9, for example, display 14 may lie in a horizontal plane and output surface 86 may lie in a non-horizontal plane (e.g., output surface 86 may be a vertical plane or a nearly vertical plane (e.g., a plane that is within 10°, 30°, or other suitable amount relative to vertical).

Figure 10:
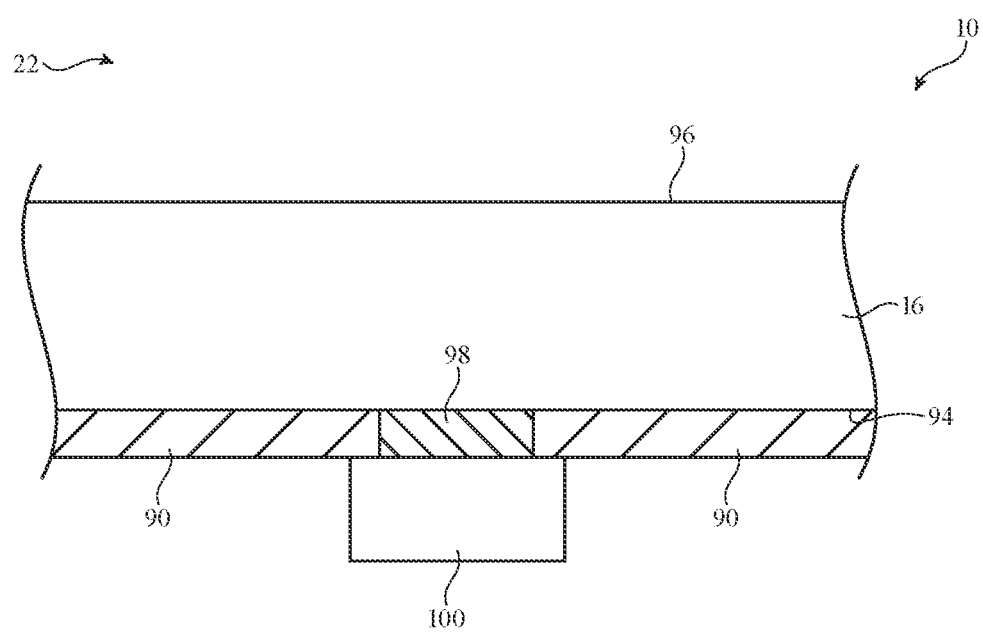
FIG. 10 is a cross-sectional side view of an illustrative image transport layer with a coating that has a window region aligned with an optical component in accordance with an embodiment.

FIG. 10 is a cross-sectional side view of a portion of device 10 in an illustrative configuration in which the inner surface of image transport layer 16 has a coating. As shown in FIG. 10, image transport layer 16 may have a first surface (e.g., an input surface) such as surface 94 and a corresponding second surface (e.g., an output surface) such as surface 96. Surface 94 can be coated with layer 90. Layer 90 may be, for example, a coating of polymer containing colorant (e.g., ink and/or pigment) such as a black ink layer or other colored ink. If desired, layer 90 may be a colored polymer film that is attached to layer 16 with adhesive. Layer 90 may have a solid appearance (e.g., layer 90 may have no discernable pattern) or may include text, icons, trim or other decorative elements, or any other suitable appearance. In some configurations, layer 90 may be opaque (e.g., the transmission of layer 90 at visible light wavelengths and/or other wavelengths may be less than 90%, less than 95%, less than 99%, or other suitable amount that blocks interior components from view from the exterior of device 10). By virtue of the presence of layer 16, the appearance of layer 90 is transported from input surface 94 to output surface 96, so that the image of layer 90 that would be observed in the absence of layer 16 is, in the presence of layer 16, visible at output surface 96.

Device 10 may have internal components such as optical component 100 or other electrical components. Optical component 100 may be overlapped by layer 90. If desired, a portion of layer 90 (e.g., portion 98) may have a different appearance and/or different optical properties. For example, portion 98 may have a different transparency than remaining portions of layer 90 at one or more wavelengths, may have a different color, haze, texture, and/or pattern than other portions of layer 90, etc. These differing properties may allow portion 98 to serve as an optical window for component 100. The outline of portion 98 may be circular or may have other suitable window shapes.

Optical component 100 may emit and/or receive light at one or more wavelengths (e.g., visible light, infrared light, and/or ultraviolet light). Component 100 may be, for example, an infrared proximity sensor that emits light (e.g., infrared light) and receives reflected light (e.g., infrared light) from external objects through layer 16, may be an optical touch sensor that emits light and receives reflected light from a user's finger or other object (e.g., visible and/or infrared light), may be a health sensor such as blood oxygen sensor or heartrate sensor, may be an ambient light sensor, may be a camera flash, may be an image sensor, or may be any other suitable light-emitting device and/or light-sensing device. Light-emitting components for component 100 may be based on light-emitting diodes and/or lasers (as examples). Light-sensing components for component 100 may be photodiodes.

In an illustrative configuration, portion 98 is configured to serve as a window in remaining portions of layer 90. For example, if layer 90 is opaque and component 100 is an ambient light sensor, portion 98 may have sufficient visible light transmission (e.g., 2-10%, at least 2%, at least 4%, less than 90%, or other suitable amount) to allow at least some ambient light from exterior 22 to pass to component 100. As another example, if layer 90 is opaque and component 100 is an infrared sensor such as an infrared proximity sensor, portion 98 may be configured to serve as an infrared-light-transmitting-and-visible-light-blocking window (e.g., so that component 100 is blocked from view from exterior 22 while infrared light is allowed to pass through portion 98 during operation of overlapped component 100).

Figure 11:
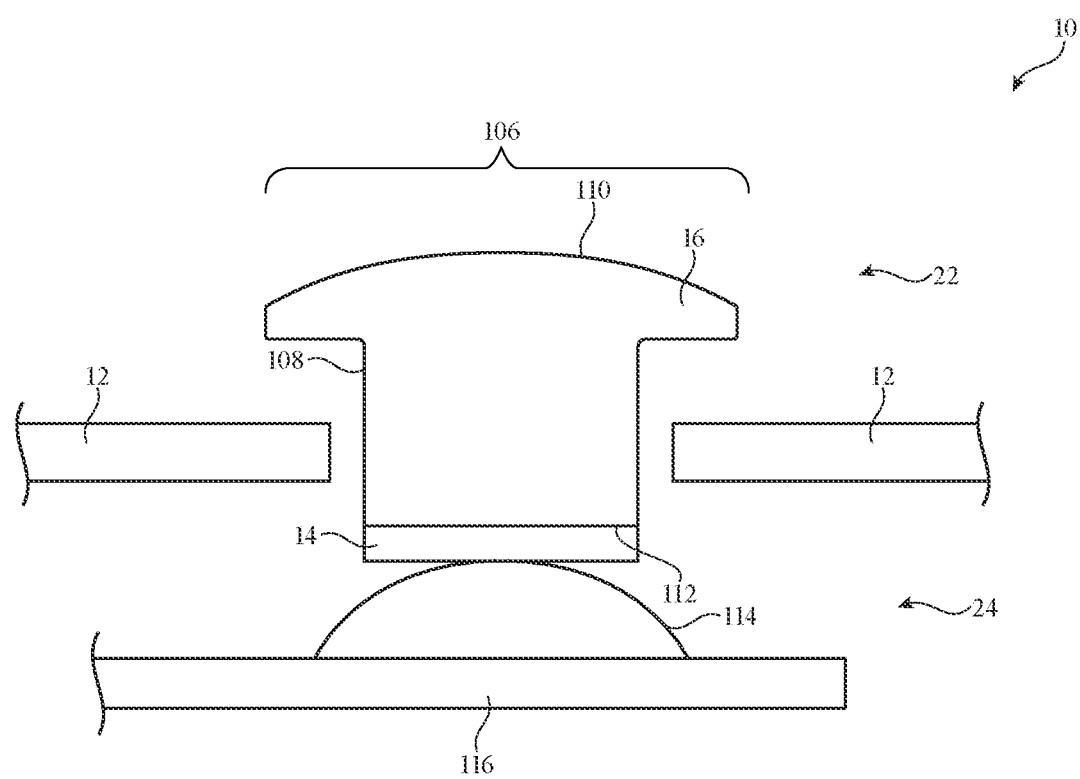
FIG. 11 is a cross-sectional side view of an illustrative button with image transport layer material in accordance with an embodiment.

As shown in FIG. 11, device 10 may include a button with an image transport layer. In the example of FIG. 11, device 10 has a housing wall such as housing 12 that separates exterior 22 from interior 24. Button 106 includes movable button member 108 and switch 114. Switch 114 may be, for example, a dome switch or other switch that is mounted on a substrate such as printed circuit 116 in interior 24 of device 10. Housing 12 may have an opening that receives button member 108. When a uses presses inwardly on button member 108, button member 108 moves inwardly against dome switch 114 and activates dome switch 114. Button 106 may be electrically coupled to control circuitry in device 10 using traces in printed circuit 116.

Button member 108 may have an exterior surface formed by output surface 110 of image transport layer 16. Output surface 110 may be curved (e.g., output surface 110 may have a convex shape and may exhibit compound curvature). A light-emitting diode or other light source such as display 14 may be mounted to input surface 112 of image transport layer 16. During operation, display 14 may present an alphanumeric label, an icon, or other image to input surface 112, which is transported to output surface 110 by image transport layer 16. Control circuitry in device 10 may adjust the image on display 14 (e.g., so that button 106 displays context-dependent labels on output surface 110).

Figure 12:
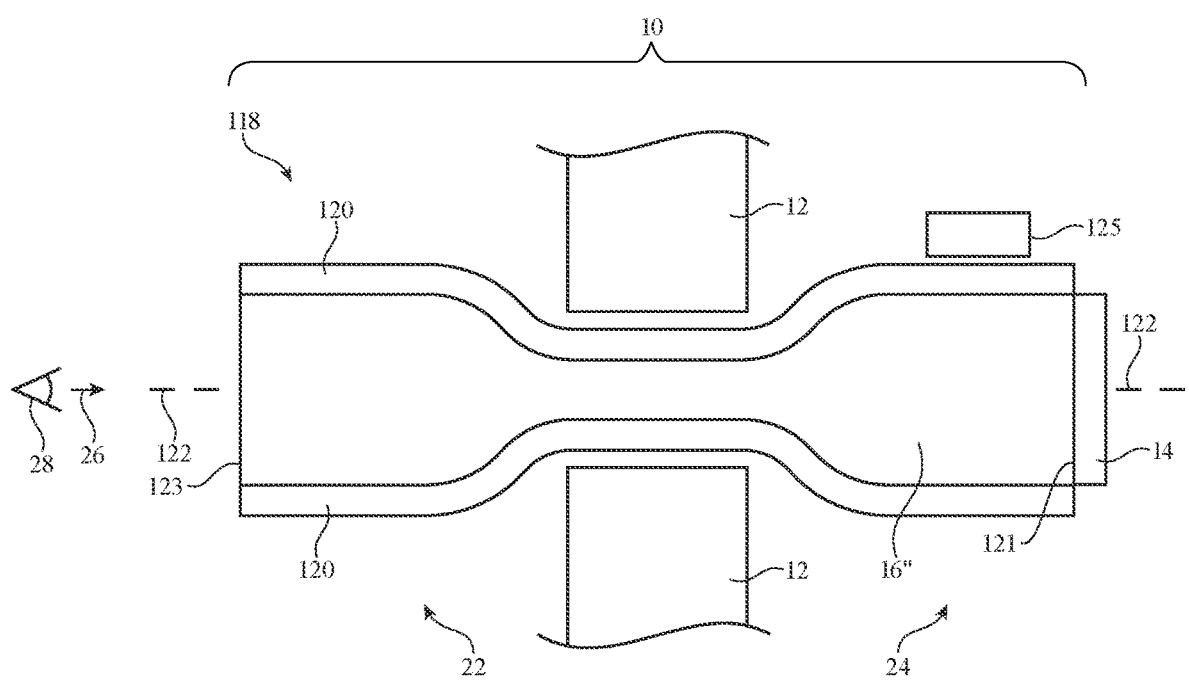
FIG. 12 is a cross-sectional side view of an illustrative button formed from a rotating button member with a shaft having image transport layer material such as a coherent fiber bundle in accordance with an embodiment.

In the illustrative configuration of FIG. 12, device 10 has a rotating button. As shown in FIG. 12, button 118 has a shaft 16" that passes through an opening in housing 12 (e.g., a polymer housing wall, a metal housing wall, a glass housing wall, etc.). Shaft 16" may be formed from image transport layer material (e.g., an elongated coherent fiber bundle or elongated member formed from Anderson localization material). The button rotates about rotational axis 112. Encoder 125 may optically and/or electrically detect user input associated with rotation of the shaft of button 118. A light-emitting diode or other light-emitting device such as display 14 may be mounted on input surface 121 of the image transport layer shaft (e.g., an elongated shaft member such as shaft 16" that is formed from a coherent fiber bundle or Anderson localization material). An image presented on display 14 may be transported form input surface 121 of shaft 16" to output surface 123 of shaft 16", where the transported image may be viewed by viewer 28. Shaft 16" may, if desired, be housed within a hollow tube such as tube 120. Tube 120 may, as an example, be formed from a material such as polymer, metal, or glass and may help protect shaft 16".

Figure 13:
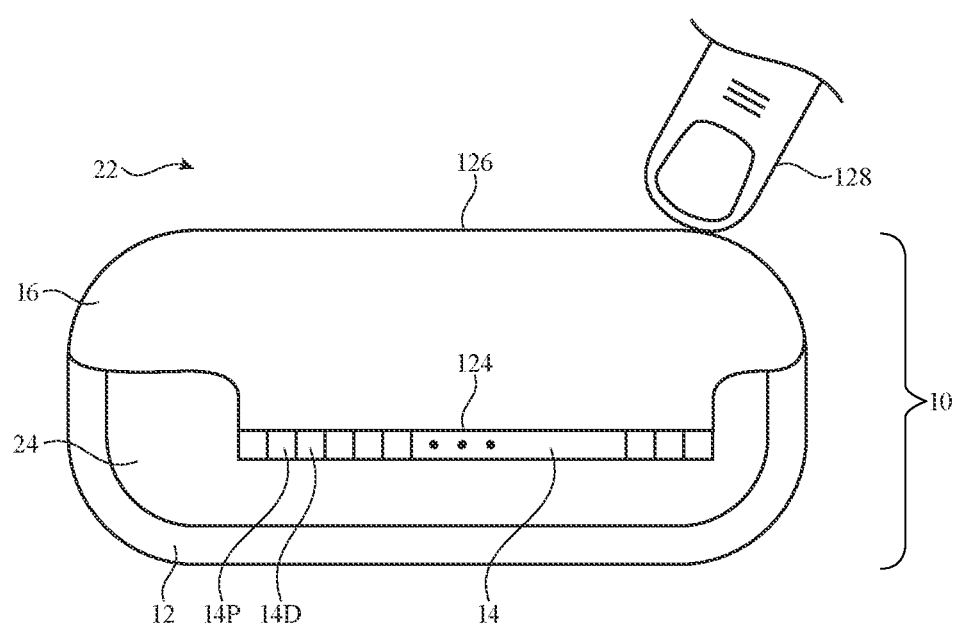
FIG. 13 is a cross-sectional side view of an illustrative electronic device having a touch sensitive display overlapped by an image transport layer in accordance with an embodiment.

FIG. 13 is a cross-sectional side view of device 10 in an illustrative configuration in which display 14 contains an array of optical sensors. As shown in FIG. 13, device 10 may have an image transport layer such as image transport layer 16 coupled to housing 12. Display 14 may be mounted in interior 24 adjacent to input surface 124 of image transport layer 16. During operation, display 14 may present an image to input surface 124 that is transported by layer 16 to corresponding output surface 126. Output surface 126 may be planar and/or may have portions with curved cross-sectional profiles. As an example, some or all of output surface 126 may have compound curvature (e.g., surface 126 may have a convex shape). Arrangements in which surface 126 has a planar central region surrounded by curved edges may also be used.

As shown in FIG. 13, display 14 may have an array of light-emitting pixels such as pixels 14P. Pixels 14P may be visible light-emitting diode pixels or other pixels that are arranged in an array and used to display an image. If desired, display 14 may contain infrared pixels (e.g., infrared light-emitting diodes) interspersed with visible light pixels. The substrate for display 14 (or a layer overlapping the substrate) may have an array of light detectors 14D. Detectors 14D may be, for example, semiconductor photodetectors (e.g., thin-film photodetectors on a common substrate with visible and/or infrared thin-film organic light-emitting diodes, etc.). Detectors 14D may be used to form a two-dimensional optical touch sensor for display 14.

During operation, pixels 14P may emit visible light that creates an image on output surface 126 and may optionally emit infrared light that passes to output surface 126. In the absence of external objects on surface 126, visible and/or infrared light emitted by display 14 passes through output surface 126 to exterior region 22. When an external object such as finger 128 touches surface 126, some of the emitted visible and/or infrared light is reflected from the external object through layer 16 back towards detectors 14D on display 14 in interior region 24 of device 10. Control circuitry in device 10 can process the detected light to determine whether finger 128 is present and, if present, to determine the location where finger 128 is touching surface 126. In this way, the light-emitting and light-sensing circuitry of display 14 may be used to form an optical touch sensor with a touch sensing surface that coincides with output surface 126. Touch input may be gathered from one or more fingers simultaneously. Touch gestures such as swipe gestures and other touch input may be used in controlling the operation of device 10.

Figure 14:
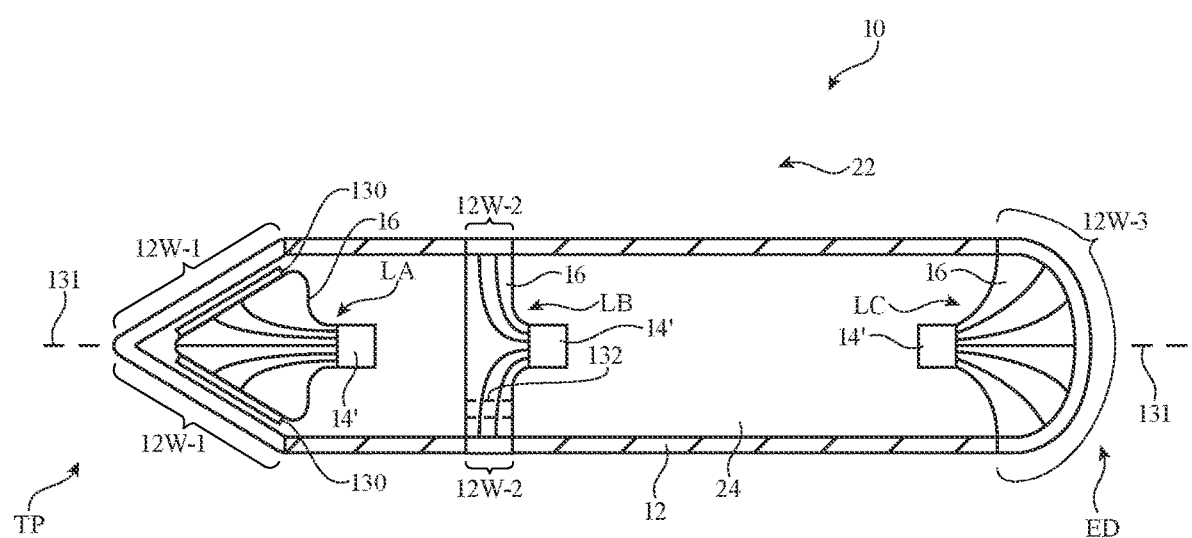
FIG. 14 is a cross-sectional side view of an illustrative device such as a computer stylus with image transport layers in accordance with an embodiment.

FIG. 14 is a cross-sectional side view of device 10 in an illustrative configuration in which device 10 is a computer stylus. Device 10 may have an elongated shape extending along longitudinal axis 131 between tip TP and opposing end ED. When gripped by a user's fingers, tip TP of device 10 may be used to supply input to a touch sensitive tablet computer display or other external equipment (e.g., to draw lines on a tablet display using a drawing program on a tablet computer).

As shown in FIG. 14, device 10 may have an elongated housing. Housing 12 may extend along longitudinal axis 131 and may have walls that separate interior region 24 from exterior region 22 surrounding device 10. Housing 12 may have a cylindrical shape or other suitable shape. At tip TP, housing 12 may taper to a point. Electrodes 130 at tip TP may be used to create electric fields that interact with capacitive touch sensors in the displays of external devices (e.g., touch sensors that can sense where electrodes 130 are located so that device 10 may serve as an input device). Electrodes 130 can be mounted on the output surface of an image transport layer such as a conical image transport layer at tip TP.

In the example of FIG. 14, there are three image transport layers 16, each of which receives visual output (e.g., diffuse light, an illuminated pattern such as an icon or text, a display image, etc.) from a corresponding visual output device 14' at a corresponding input surface for that image transport layer. Devices 14' may be light-emitting diodes or other light sources. If desired, one or more of devices 14' may be a display (e.g., an array of pixels configured to produce an image with text, icons, and/or other image content).

During operation of device 10, it may be desirable to provide a user of device 10 with status information. This information may include visual output indicating the power status of device 10 (e.g., a red output if device 10 is off and a green output if device 10 is on), the current color or brush selected in a drawing program (e.g., a blue indicator if a blue color is selected, a pointed brush icon if a pointed brush is selected, a wide brush icon if a wide brush is selected, etc.), the current line type that is in use by a drawing program that is being controlled by device 10 (e.g., line width, line style, etc.), or other information on the operating mode of device 10 and/or a program on external equipment that is being controlled using device 10. One or more of devices 14' can supply text, icons, blanket fields of color, still and/or moving images, and/or other visual output that visually presents status information and/or other information to a user of device 10.

In the example of FIG. 14, housing 12 has transparent window regions that overlap corresponding output surfaces of image transport layers 16. The output surface of image transport layers 16 of FIG. 14 may be rotationally symmetric around axis 131 (as an example). This allows a user to view visual content on the output surfaces of the image transport layers without being concerned about the rotational orientation of device 10 in the user's fingers.

A first image transport layer 16 at location LA receives a first image (e.g., an image from a display or other visual output) from a first of devices 14' near tip TP and transports the first image to the output surface of layer 16 at location LA. The image transport layer at location LA may have a conical output surface shape or other tapered shape that fits within the tapered tip of housing 12. Transparent window 12W-1 in housing 12 overlaps electrodes 130 and the output surface. Electrodes 130 may be formed from a transparent conductive material such as indium tin oxide. This allows a user to view the image on the output surface of layer 16 at location LA through transparent window 12W-1 and through electrodes 130.

A second image transport layer 16 at location LB receives a second image (e.g., an image from a display or other visual output) from a second of devices 14' and transports the second image to the output surface of layer 16 at location LB. This output surface may have a ring shape (e.g., a cylindrical surface running around the circumference of housing 12). Transparent window 12W-2 (e.g., a cylindrical ring-shaped window) overlaps the output surface of layer 16 at location LB and allows the visual output that is presented on this output surface to be viewed by the user. There may be one or more cylindrical windows such as window 12W-2 along the length of housing 12.

At end ED of device 10, housing 12 has a curved cross-sectional profile. Transparent window 12W-3 may have a convex dome shape and may be characterized by compound curvature. A third image transport layer 16 at location LC receives a third image (e.g., an image from a display or other visual output) from a third of devices 14' near end ED and transports the third image to the output surface of layer 16. Transparent window region 12W-3 overlaps this output surface, so that the user may view visual output on the output surface through window 12W-3.

Figure 15:
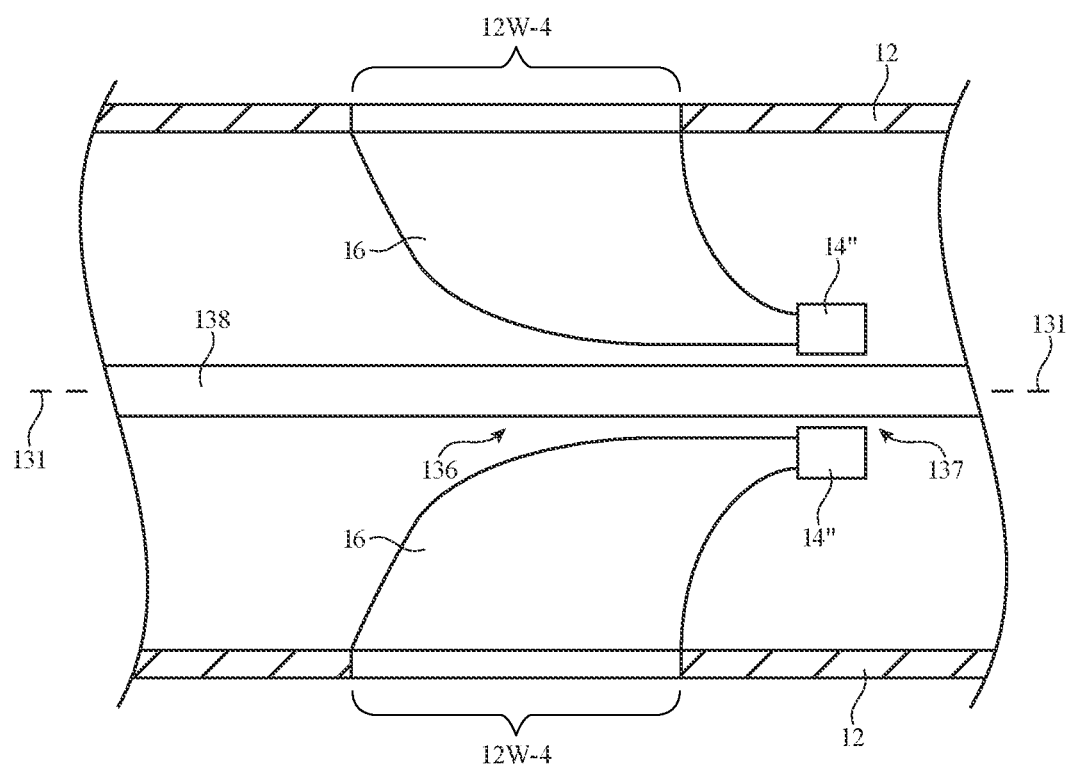
FIG. 15 is a cross-sectional side view of an illustrative device such as a computer stylus with an image transport layer that may be provided with light from a ring-shaped illumination source in accordance with an embodiment.

If desired, image transport layer 16 may have a ring shape that surrounds a central opening. This type of arrangement is shown in the cross-sectional side view of device 10 of FIG. 15. In the example of FIG. 15, light-emitting device 14" has a ring shape and surrounds longitudinal axis 131. Image transport layer 16 and its input surface also have ring shapes that surround longitudinal axis 131. A central opening in device 14" and a central opening in layer 16 can accommodate longitudinally extending structures such as structures 138.

Housing 12 of device 10 of FIG. 15 may be elongated along longitudinal axis 131 (e.g., device 10 of FIG. 15 may be a computer stylus or other device such as device 10 of FIG. 14). Structures 138 may extend along this axis through opening 136 in image transport layer 16. Structures 138 may include wires that form signal paths, printed circuits (e.g., printed circuits with signal paths formed from metal traces), electrical components, and/or other portions of device 10. For example, structures 138 may include signal paths that interconnect circuitry at tip TP with circuitry at end ED. Opening 136 may have a circular shape or other suitable shape. Image transport layer 16 may have a ring-shaped input surface that surrounds axis 131 and opening 136. The input surface may receive an image or other visual output from device 14" (e.g., a ring-shaped display, ring-shaped light-emitting device based on one or more light-emitting diodes or lasers, or other light-emitting device). The image received at the input surface may be transported to an output surface of layer 16 that lies under transparent window 12W-4. The output surface and window 12W-4 may be cylindrical. Device 14" may include one or more light-emitting components (e.g., light-emitting diodes) arranged in a ring surrounding axis 131. Device 14" (e.g., a display panel, a printed circuit on which light-emitting diodes are mounted, etc.) may have an opening such as opening 137 through which structures 138 may pass.

Figure 16:
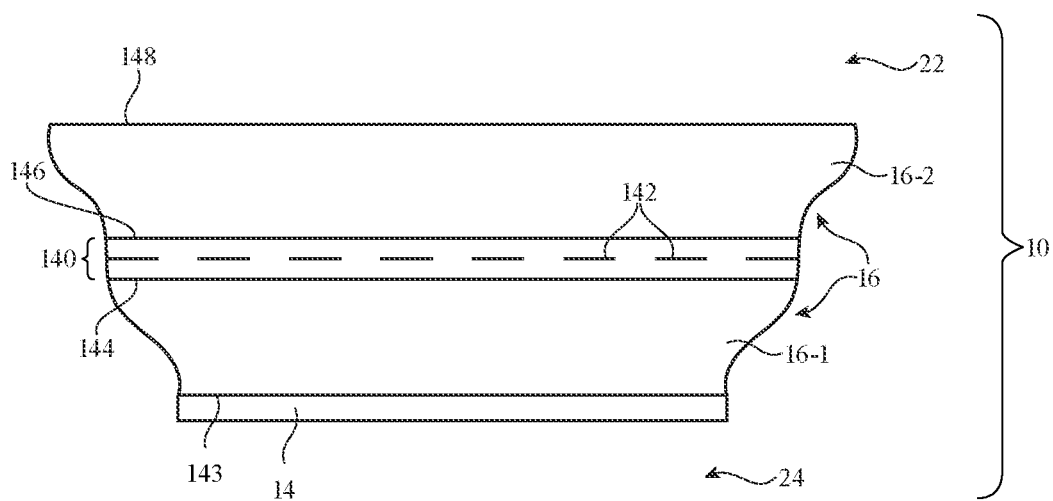
FIG. 16 is a cross-sectional side view of a portion of an illustrative electronic device with stacked image transport layers and an interposed touch sensor in accordance with an embodiment.

FIG. 16 is a cross-sectional side view of a portion of device 10 in an illustrative configuration in which image transport layer 16 has first and second sublayers. A first sublayer such as image transport layer 16-1 has input surface 143 and corresponding output surface 144. A second sublayer such as image transport layer 16-2 has input surface 146 and output surface 148. Output surface 148 may face exterior region 22 surrounding device 10. Input surface 143 may face interior 24.

As shown in FIG. 16, display 14 may be mounted adjacent to input surface 143. During operation, display 14 may present an image to input surface 143 that is transported to output surface 148 through layer 16.

A sensor layer such as touch sensor layer 140 and/or other components may be interposed between layers 16-1 and 16-2. As an example, a two-dimensional array of transparent capacitive touch sensor electrodes 142 may be used to form a two-dimensional capacitive touch sensor between output surface 144 of layer 16-1 and input surface 146 of layer 16-2. This touch sensor may gather touch input as a user touches surface 148 with one or more fingers or other external objects.

Electrodes 142 may be formed from a transparent conductive material such as indium tin oxide. Electrodes 142 may be mounted on a clear transparent substrate (e.g., a transparent polymer film), may be formed from a patterned coating on surface 144, may be formed from a patterned coating on surface 146, and/or may have other configurations. Layer 140 may include transparent adhesive or other structures to help couple optically and mechanically couple layers 16-1 and 16-2 together. For example, layer 140 may have adhesive with a refractive index that is matched to that of layer 16. Because layer 140 is transparent and relatively thin (e.g., less than 0.3 mm, less than 0.1 mm, or other suitable thickness), the image that is presented to output surface 144 of layer 16-1 may be received at input surface 146 of layer 16-2 and subsequently conveyed to output surface 148 through layer 16-2. The arrangement of FIG. 16 therefore helps transport an image from display 14 to output surface 148 while ensuring that the two-dimensional capacitive touch sensor or other circuitry of layer 140 is close to the exterior surface of device 10 (e.g., surface 148) and is therefore able to satisfactorily detect when a user's fingers or other objects are present on this surface. Surface 148 may be planar, may have a curved cross-sectional profile, may have areas of compound curvature, etc.

Figure 17:
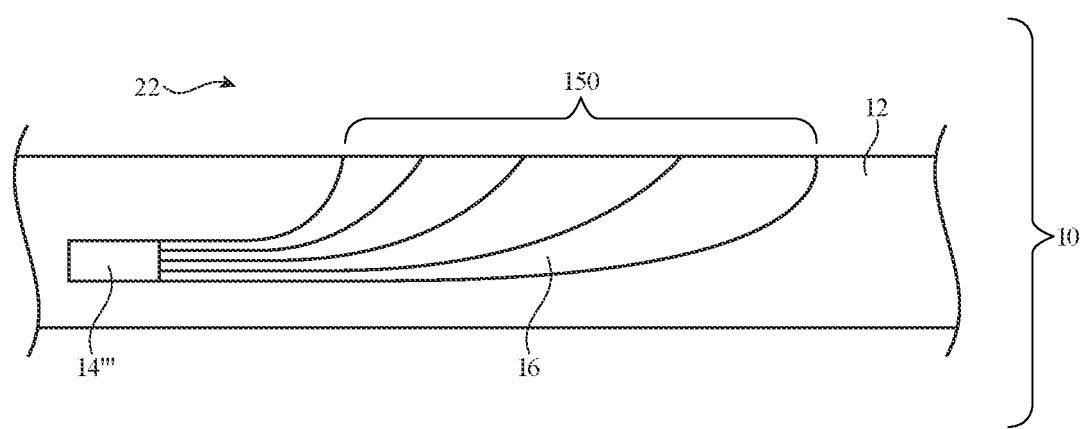
FIG. 17 is a cross-sectional side view of an illustrative image transport layer that may be used to illuminate a logo or other pattern on the surface of an electronic device housing in accordance with an embodiment.

FIG. 17 shows how image transport layer 16 may be used to display a logo or other visual output on the exterior surface of housing 12. In the example of FIG. 17, image transport layer 16 has an input surface that receives an image (e.g., a display image or visual output such as light from one or more light-emitting diodes) from visual output device 14'''. Visual output device 14''' may be a display, a light-emitting diode, a set of 2-10 light-emitting diodes, a set of more than 10 light-emitting diodes, one or more lasers, or other light-emitting device. Device 14''' and image transport layer 16 may be mounted in housing 12. Housing 12 may be, for example, a laptop computer housing such as the upper housing in a laptop computer. Image transport layer 16 of FIG. 17 has a shape that routes visual output from device 14''' to output surface 150.

Output surface 150 may be visible on the exterior surface of housing 12. For example, output surface 150 may lie flush with the exterior surface of housing 12 or nearly flush with the exterior surface of housing 12. If desired, a diffuser layer, a patterned optical mask, a protective housing wall, and/or other structures may overlap surface 150. With an illustrative configuration, the outline of surface 150 may have the shape of a logo, so that an illuminated logo will be visible on the surface of housing 12 when device 14''' is active and emitting light. In another illustrative configuration, device 14''' may present an image with fixed and/or moving text and other image content. This image may be presented on surface 150 to serve as a notification or other message for a user of device 10. In the example of FIG. 17, output surface 150 is planar. This is illustrative. Any suitable image transfer layer output surface shapes may be used when displaying notifications (e.g., cylindrical surfaces, dome-shaped surfaces, and cone-shaped surfaces of the type described in connection with FIG. 14, etc.).

Figure 18:
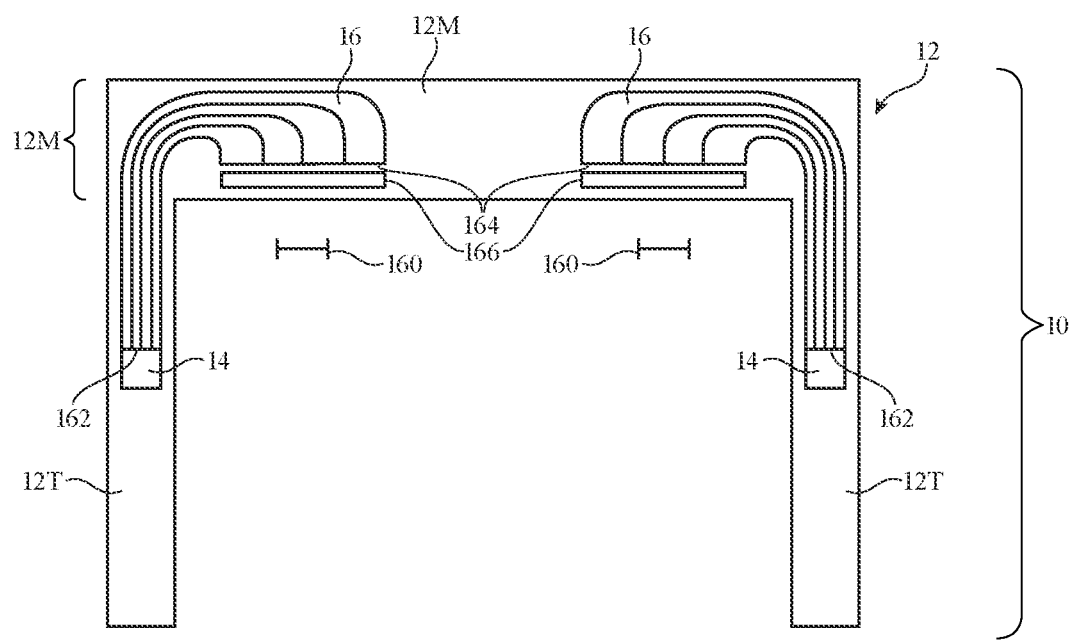
FIG. 18 is a cross-sectional view of a head-mounted device with image transport structures such as coherent fiber bundles that convey images from displays within temples in glasses or other head-mounted device support structures to eye boxes for viewing by a user in accordance with an embodiment.

If desired, image transport layers may be used to convey images in a head-mounted device. Consider, as an example, head-mounted device 10 of FIG. 18. As shown in FIG. 18, housing 12 in device 10 may have a main portion 12M that supports lenses 166 in front of eye boxes 160. During operation, a user may view images through lenses 166 when the user's eyes are located in eye boxes 160). Housing 12 may be configured to be worn on a user's head. For example, main portion 12M and side portions 12T of housing 12 may be housing structures (sometimes referred to as head-mounted support structures) that are configured to be worn on a user's head. Side portions 12T of housing 12, which may include straps, headbands, temples in eye glasses, and/or other support structures, may include displays 14. There may be, for example, a first of displays 14 for a left portion of device 10 and a second of displays 14 for a right portion of device 10 (as an example). Displays 14 may be organic light-emitting diode displays, liquid crystal displays (e.g., liquid-crystal-on-silicon displays), scanning mirror display devices, digital micromirror devices (e.g., two-dimensional arrays of microelectromechanical systems mirrors), and/or other displays. Image transport layers 16 may have input surfaces 162 that receive images from displays 14 in portions 12T of housing 12 and may have corresponding output surfaces 164 to which the images from displays 14 are transported. Output surfaces 164 may face eye boxes 160, so that a user may view the images on output surfaces 164 through lenses 166 that are interposed between output surfaces 164 and eye boxes 160.

If desired, device 10 may include flexible display structures. For example, a flexible organic light-emitting diode display may be wrapped into a cylindrical shape as shown by flexible display 14 of FIG. 19. A gap G3 may be present between the pixels along opposing edges of display 14 after display 14 has been formed into a cylindrical shape.

Figure 19:
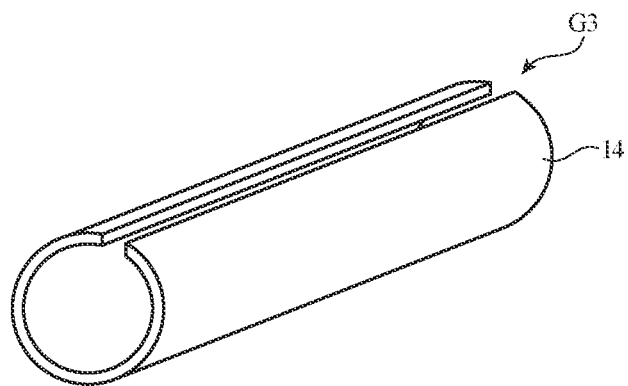
FIG. 19 is a perspective view of a flexible display that has been bent into a cylindrical shape in accordance with an embodiment.
Figure 20:
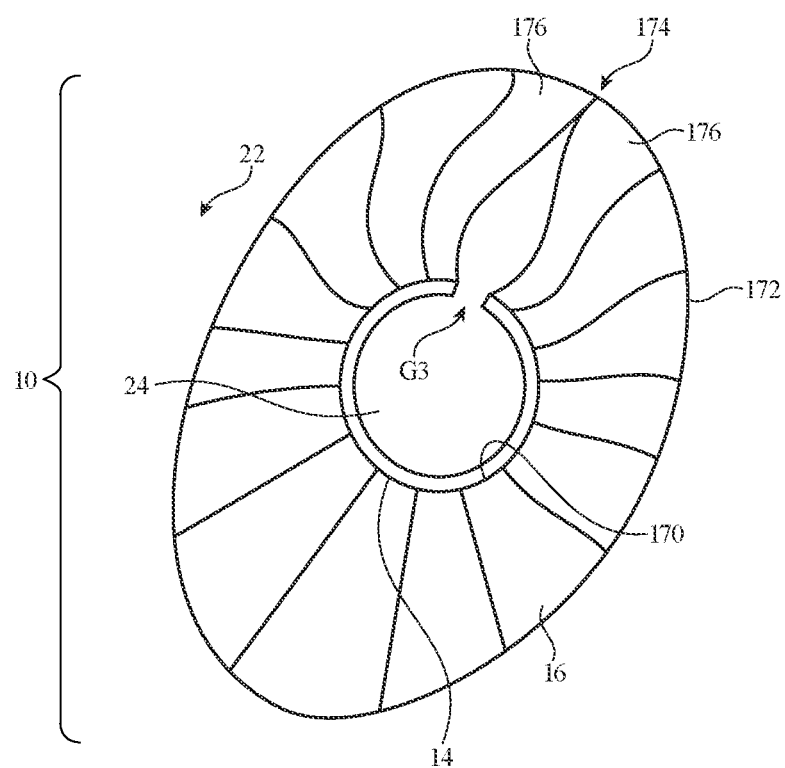
FIG. 20 is a cross-sectional view of an illustrative electronic device with an image transport layer having a cylindrical input surface and a corresponding output surface in accordance with an embodiment.

As shown in the cross-sectional side view of device 10 of FIG. 20, a display such as display 14 of FIG. 19 may be overlapped by an image transport layer. Image transport layer 16 of FIG. 20 may have a cylindrical input surface 170 that receives an image presented on the outwardly facing surface of display 14. Image transport layer 16 may have a corresponding output surface 172 to which the image on input surface 170 is transported. Output surface 172 may have a cylindrical shape, a shape with planar portions, portions with curved cross-sectional profiles, areas with compound curvature, and/or other suitable shapes. Touch sensor circuitry (e.g., a two-dimensional optical touch sensor formed from photodetectors and optional infrared light-emitting diodes of the type described in connection with FIG. 13) may be incorporated into display 14 and/or other displays in devices 10.

In the example of FIG. 20, portions 176 of image transport layer 16 are deformed to cover gap G3 while meeting smoothly along seam 174. This allows an image to be displayed on surface 172 that extends seamlessly around the entire perimeter of device 10. Electrical components for device 10 (e.g., control circuitry, sensors, a battery, and/or other circuitry) may be mounted in interior region 24 (e.g., an area of device 10 that is surrounded by display 14). Device 10 of FIG. 20 and the other FIGS. may be a cellular telephone, a wristwatch, a tablet computer, a desktop computer, a voice-control speaker, a computer monitor, a television, a head-mounted device, an electronic device accessory such as a computer mouse, a computer stylus, an ear bud, or other accessory, a voice-controlled speaker, an embedded system, and/or other electronic equipment.

As described above, one aspect of the present technology is the gathering and use of information such as sensor information. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

What is claimed is:

1. An electronic device, comprising:
a display having an optical touch sensor, wherein the display is configured to produce an image; and
an image transport layer configured to receive the image at an input surface and to transport the received image to an output surface, wherein the optical touch sensor comprises a light-emitting diode that is configured to emit light through the image transport layer and a photodetector that is configured to receive a reflected version of the light through the image transport layer to gather touch input on the output surface.

2. The electronic device defined in claim 1 wherein the optical touch sensor comprises an array of photodetectors that include the photodetector.

3. The electronic device defined in claim 2 wherein the photodetectors comprise infrared photodetectors, wherein the optical touch sensor comprises an array of light-emitting diodes that include the light-emitting diode, and wherein the light-emitting diodes comprise infrared light-emitting diodes configured to emit infrared light.

4. The electronic device defined in claim 1 wherein the display comprises a flexible display with a curved cross-sectional profile.

5. The electronic device defined in claim 4 wherein the image transport layer comprises deformed portions that hide a gap between a first edge of the display and a second edge of the display.

6. An electronic device, comprising:
an elongated housing that extends between a tip and an opposing end;
a display that is configured to produce an image; and
an image transport layer configured to receive the image at an input surface and to transport the received image to an output surface at the tip.

7. The electronic device defined in claim 6 wherein the elongated housing has a transparent window at the tip that overlaps the image transport layer and wherein the image transport layer has a tapered shape.

8. The electronic device defined in claim 7 further comprising an additional image transport layer, wherein the additional image transport layer has a ring shape with a cylindrical surface that is overlapped by a cylindrical transparent portion of the housing at a location between the tip and the opposing end.

9. The electronic device defined in claim 8 wherein the additional image transport layer has an opening and wherein the electronic device further comprises structures that pass through the opening.

10. The electronic device defined in claim 9 wherein the elongated housing extends along a longitudinal axis and wherein the structures comprise signal paths that extend along the longitudinal axis through the opening in the image transport layer.

11. An electronic device, comprising:
a component in an interior region;
an image transport layer having an input surface facing the interior region and an output surface facing an exterior region;
a coating on the input surface, wherein a portion of the coating is configured to form a window aligned with the component.

12. The electronic device defined in claim 11 wherein the component comprises an optical component.

13. The electronic device defined in claim 12 wherein the optical component comprises an ambient light sensor.

14. The electronic device defined in claim 13 wherein the optical component is configured to emit light that passes through the window and wherein the optical component is configured to detect light that passes through the window.

15. An electronic device comprising:
a housing having an opening;
a button having a shaft formed from a coherent fiber bundle that extends through the opening; and
a light-emitting device coupled to an input surface of the coherent fiber bundle, wherein the coherent fiber bundle is configured to supply light received from the light-emitting device at the input surface to an output surface of the coherent fiber bundle, and wherein the output surface of the coherent fiber bundle is curved.

16. The electronic device defined in claim 15 wherein the shaft is configured to rotate within the opening.

17. The electronic device defined in claim 16 wherein the light-emitting device comprises a display configured to provide an image to the input surface.

18. An electronic device, comprising:
a first image transport layer having a circular outline, having an input surface, and having an output surface with compound curvature;
a light-emitting device configured to provide light to the input surface of the first image transport layer; and
a second image transport layer having a cylindrical shape, wherein the first image transport layer and the second image transport layer have portions that join along a seam.

19. The electronic device defined in claim 18 wherein the light-emitting device comprises a first display that is configured to present a first image to the input surface, the electronic device further comprising a second display that is configured to present a second image to the second image transport layer.

20. The electronic device defined in claim 19 further comprising a voice-controlled speaker.

21. An electronic device, comprising:
a display configured to produce an image; and
a first image transport layer;
a second image transport layer; and
a touch sensor between the first and second image transport layers, wherein the first image transport layer is configured to receive the image at a first input surface of the first image transport layer and is configured to transport the received image from the first input surface to a first output surface of the first image transport layer and wherein the second image transport layer is configured to receive the image from the first output surface of the first image transport layer at a second input surface of the second image transport layer and is configured to transport the received image from the second input surface to a second output surface of the second image transport layer.

22. The electronic device defined in claim 21 wherein the touch sensor comprises a two-dimensional capacitive touch sensor with transparent electrodes.

* * * * *